(12) United States Patent
Wilkins

(10) Patent No.: US 8,439,688 B2
(45) Date of Patent: May 14, 2013

(54) ORTHOPEDIC PROCEDURES TRAINING SIMULATOR

(76) Inventor: Jason D. Wilkins, Springfield, MO (US)

( * ) Notice: Subject to any disclaimer, the term of this patent is extended or adjusted under 35 U.S.C. 154(b) by 1283 days.

(21) Appl. No.: 12/223,619

(22) PCT Filed: Apr. 7, 2006

(86) PCT No.: PCT/US2006/013259
§ 371 (c)(1),
(2), (4) Date: Aug. 5, 2008

(87) PCT Pub. No.: WO2006/110629
PCT Pub. Date: Oct. 19, 2006

(65) Prior Publication Data
US 2009/0305215 A1 Dec. 10, 2009

Related U.S. Application Data

(60) Provisional application No. 60/669,027, filed on Apr. 7, 2005.

(51) Int. Cl.
G09B 23/28 (2006.01)
G09B 23/32 (2006.01)

(52) U.S. Cl.
USPC ............ 434/274; 434/262; 434/267; 434/275

(58) Field of Classification Search .................. 434/274, 434/262, 267, 275
See application file for complete search history.

(56) References Cited

U.S. PATENT DOCUMENTS

| 2,103,021 | A | | 12/1927 | Salsman | |
|---|---|---|---|---|---|
| 2,197,975 | A | | 4/1940 | Fleet | |
| 3,895,451 | A | | 7/1975 | Smrcka | |
| 4,331,428 | A | | 5/1982 | Chandler | |
| 4,349,339 | A | * | 9/1982 | Daniel | 434/274 |
| 4,350,490 | A | | 9/1982 | Sandegard | |
| 4,605,373 | A | | 8/1986 | Rosen | |
| 4,773,865 | A | | 9/1988 | Baldwin | |
| 4,802,858 | A | | 2/1989 | Lindskog et al. | |
| 4,850,877 | A | * | 7/1989 | Mason et al. | 434/274 |

(Continued)

FOREIGN PATENT DOCUMENTS

| WO | WO 99/42978 | 8/1999 |
|---|---|---|
| WO | WO 01/78015 | 10/2001 |
| WO | WO 2004/030599 | 4/2004 |

*Primary Examiner* — Kang Hu
(74) *Attorney, Agent, or Firm* — Richard C. Litman

(57) ABSTRACT

The orthopedic procedures training simulator (100) is a mannequin (102) having an internal skeletal structure (104) for simulating orthopedic injuries. The interior skeletal structure (104) includes a plurality of skeletal structures, each movable between a first position simulating normal and healthy skeletal structure and a second position simulating an orthopedic injury. Motor tensionable cables joining larger joint structures allow for simulating muscular tension affecting the ability to reduce a dislocation of the joint. Force and positional sensors are disposed within the skeletal structures, and provide information to a computer system (700) to perform and monitor simulation. A computer program reads the sensors, and controls the motor tensionable cables to simulate orthopedic injuries and responses to applied corrective procedures and medications. The program generates pre-procedural x-ray images based on a desired simulation, and post-procedural x-ray images based on information obtained from the sensors both during and after the performance of a procedure.

12 Claims, 14 Drawing Sheets

U.S. PATENT DOCUMENTS

| | | | |
|---|---|---|---|
| 5,018,977 A * | 5/1991 | Wiley et al. | 434/274 |
| 5,648,915 A | 7/1997 | McKinney et al. | |
| 5,873,734 A | 2/1999 | Griswold | |
| 5,967,790 A | 10/1999 | Strover et al. | |
| 6,409,516 B1 | 6/2002 | Thill | |
| 6,422,874 B1 | 7/2002 | Green | |
| 6,468,087 B2 | 10/2002 | Slocum | |
| 6,582,232 B1 | 6/2003 | Ney | |
| 7,384,268 B2 * | 6/2008 | Browne-Wilkinson | 434/274 |
| 7,834,527 B2 * | 11/2010 | Alvarez Icaza Rivera et al. | 310/344 |
| 7,850,456 B2 * | 12/2010 | Chosack et al. | 434/272 |
| 2003/0183025 A1 | 10/2003 | Krstic | |
| 2003/0225365 A1 | 12/2003 | Greff et al. | |

* cited by examiner

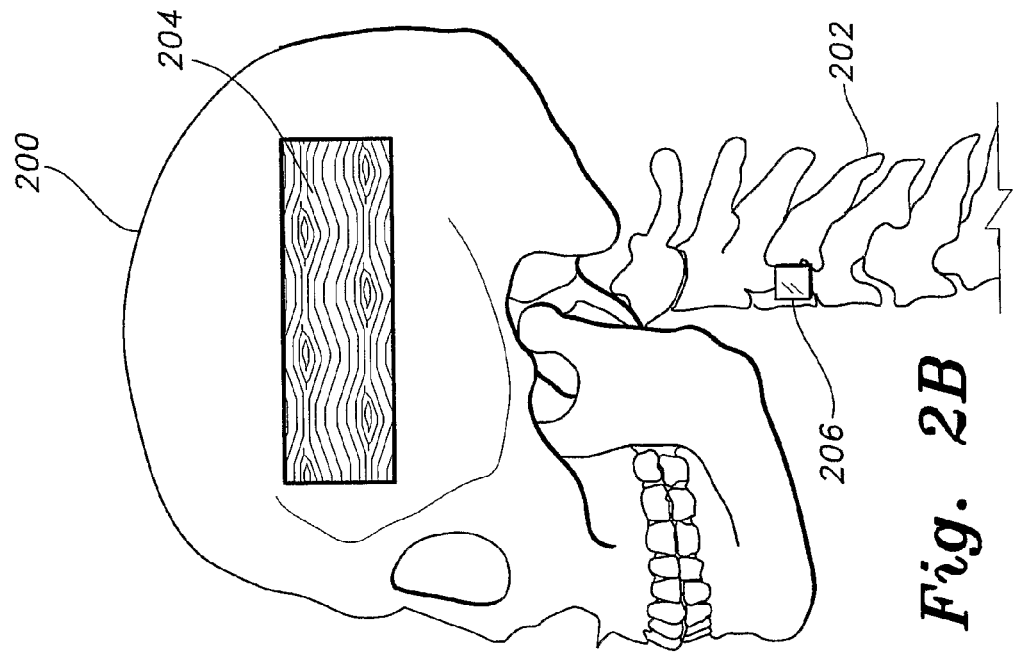
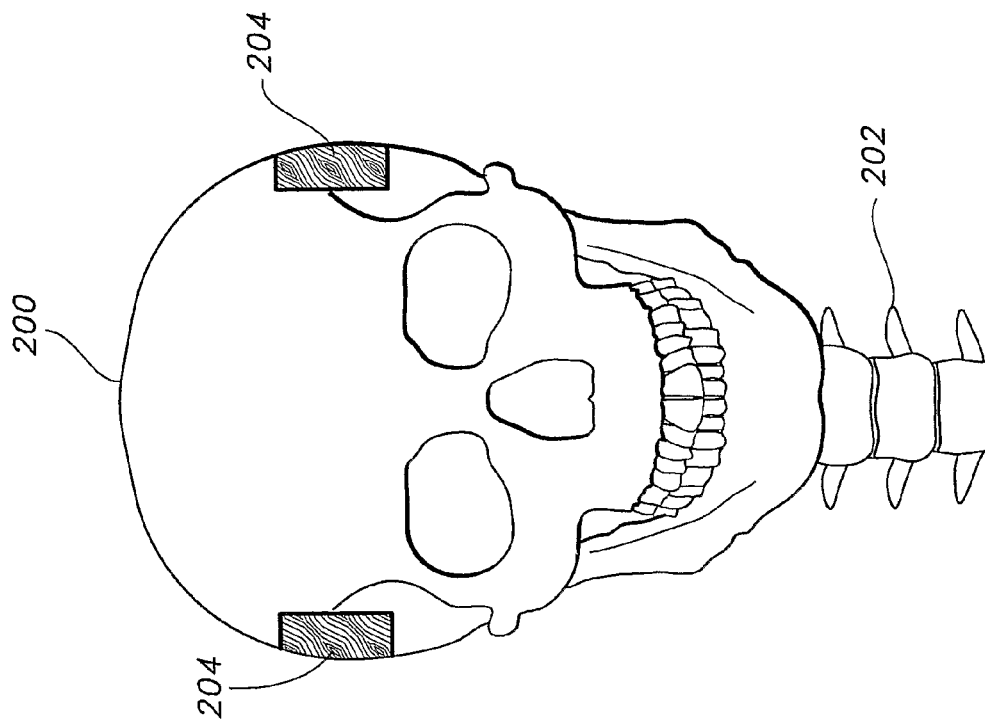

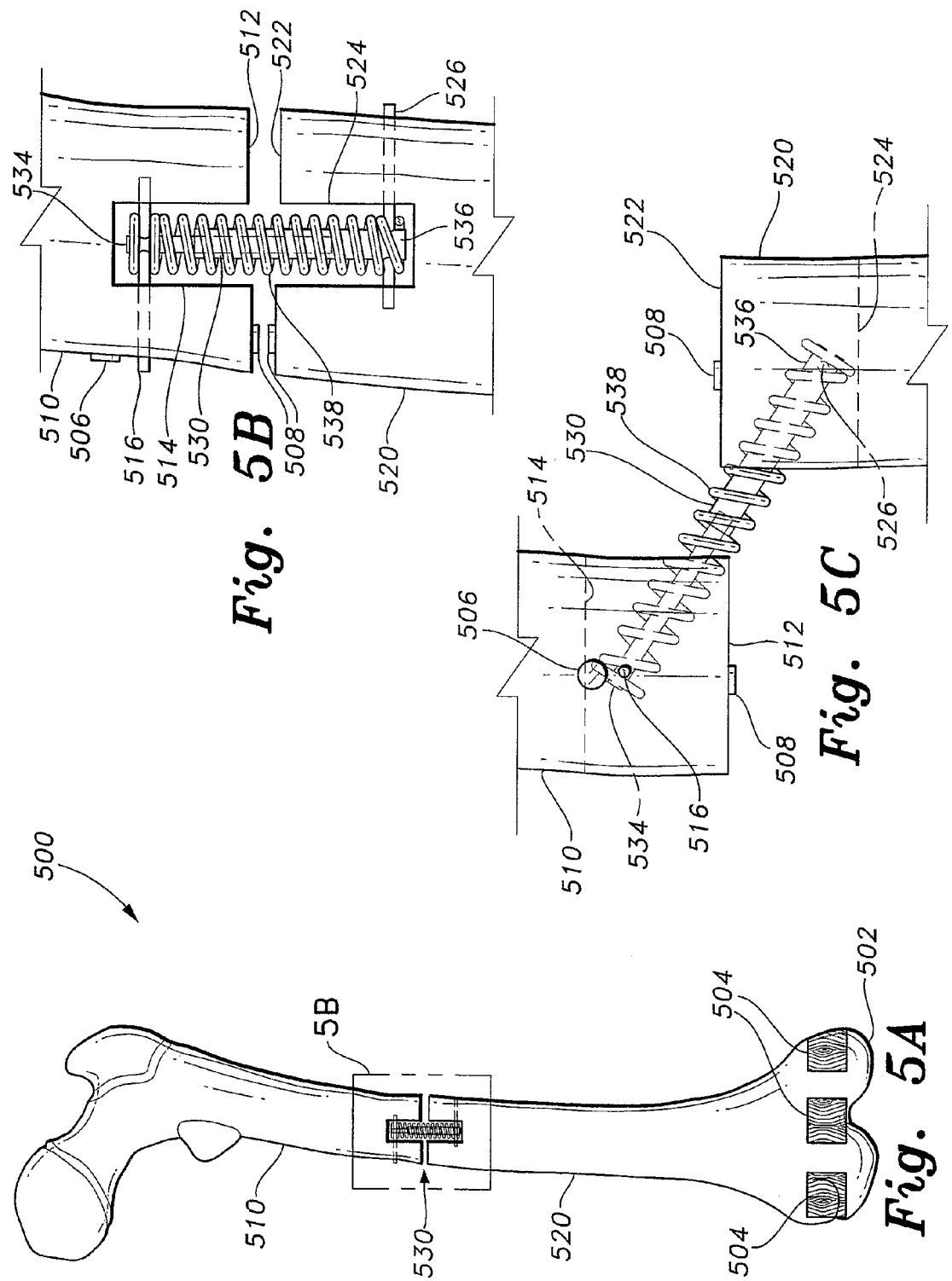

ORTHOPEDIC PROCEDURES TRAINING SIMULATOR

CROSS-REFERENCE TO RELATED APPLICATION

This application is a 371 of PCT/US06/13259, filed Apr. 7, 2006, which claims the benefit of U.S. Provisional Patent Application Ser. No. 60/669,027, filed Apr. 7, 2005.

TECHNICAL FIELD

The present invention relates to medical training methods and devices, and more particularly to an orthopedic procedures training simulator that provides training for the diagnosis and treatment procedures of noxious orthopedic events.

BACKGROUND ART

Orthopedic procedures are difficult for medical students to learn, largely because of limited opportunities for students and residents to perform the procedures. Medical students and residents are allowed only limited experiences in performing orthopedic procedures on actual patients, both because of limited availability of patients with certain injuries requiring specialized procedures and because of the risk that procedural errors by an untrained student or resident might lead to further injury to the patient.

Medical models are well known training devices, providing a physical model of various parts of a human body. Medical models allow a student to see the relationship and interaction of various anatomical parts. In some instances, a model may be disassembled and reassembled to increase visualization and understanding of complex human anatomy. While the anatomical and structural insights that may be gained by use of a medical model may inform a student on the function and need for a particular procedure to correct a given injury, such models are generally limited in scope and are functionally inadequate in actually simulating a given injury to allow practice of a corrective orthopedic procedure.

While some medical models have been devised to illustrate orthopedic injuries, and in some devices even allowing demonstration of a mechanical reduction of the injury, simple mechanical aspects of an injury and reduction procedure are often insufficient for adequate training. Correct diagnosis of an orthopedic injury must be made prior to the performance of a corrective procedure. Because diagnosis is typically made based on x-ray images along with external observation and palpation, certain medical models, such as skeletal models, are inappropriate for diagnostic training. Moreover, a corrective procedure may, in certain circumstances, require administration of a medication in conjunction with a mechanical manipulation or reduction.

The reduction of a shoulder dislocation, for example, may require administration of a sedative or muscle relaxant if the muscles of the shoulder are tightened to the extent that the dislocation can't be mechanically reduced without application of excessive force. A student, practicing such a procedure, must recognize the condition and respond accordingly. A simple mechanical model lacks the ability to first, simulate a condition suggesting the need for such medication, and second, simulate a physical response to the administration of the medication.

Thus, an orthopedic procedures training simulator solving the aforementioned problems is desired.

DISCLOSURE OF INVENTION

The orthopedic procedures training simulator is a figure or mannequin having an internal skeletal structure adapted for simulating various orthopedic noxious events or injuries including joint dislocations and bone fractures. The mannequin may be of a human form, or in various alternative forms, such as for the training and simulation of veterinary orthopedic procedures.

Joints throughout the skeletal structure, such as finger joints, wrist and ankle joints, knee and elbow joints, and so forth are joined by a spring hinge mechanism, whereby the joint may be separated to simulate dislocation of the joint. A tension spring member requires that a certain amount of tension be applied to skeletal members adjoining the joint to effect a proper reduction, or relocation, of the dislocation.

Larger joints, such as the shoulder and hip joints, employ a system of motor-tensioned cables to join adjacent skeletal members. Cables may be located about each joint to simulate muscles and tendons of the human anatomy, providing for realistic mechanical action and feel of the joints. A computer system controls the motors to tension or relax the cables, allowing the shoulder and hip joints to be selectively dislocated or reduced. The computer system accepts entry of medication orders, including sedative, local or regional anesthetic, and other medications, to vary the tension applied to the cables, allowing procedural training to include use of medication, such as a sedative, to facilitate reduction of a dislocated shoulder or hip.

The skeletal structure is instrumented by stress and torque sensors, position sensors, and electrical contacts located on and near the skeletal members of the various skeletal joints. Additionally, sensors are located adjacent to simulated breaks within various skeletal members. The various sensors are read by the computer system and provide information, such as force applied during practice of a procedure and the position of the skeletal members relative to one another.

Positional information gathered from the sensors leads to generation of simulated x-ray images (showing a break or dislocation where skeletal members are moved from a normal position, or showing a correct post-procedure image where a procedure has been properly performed). Stress or torque information may be used to indicate when a procedure is incorrectly performed, such as by applying excessive force or a directionally incorrect force. An excessive or incorrect force may result in a simulation of a further injury, such as a bone broken by the excessive force.

The computer system further allows entry of neurovascular exam findings incorporated into the simulation and training.

Thus, the orthopedic procedures training simulator allows a student or trainee unlimited opportunity for training and practice of orthopedic procedures, including the administration and effect of various medications, without the risks attendant to performing the procedures on an actual patient.

These and other features of the present invention will become readily apparent upon further review of the following specification and drawings.

BRIEF DESCRIPTION OF DRAWINGS

FIG. 2A is an anterior view of a skull member of the skeletal structure of FIG. 1C.

FIG. 2B is a lateral view of the skull of FIG. 2A.

FIG. 5A is an anterior view of a skeletal femur member jointed for simulation of a fracture.

FIG. 5B is an anterior view of a spring hinged joint within the femur member of FIG. 5A, the joint shown in a normal (unbroken) position.

FIG. 5C is a lateral view of the spring hinged joint within the femur member of FIG. 5A, the joint shown in a position simulating a dislocated break of the femur.

Similar reference characters denote corresponding features consistently throughout the attached drawings.

BEST MODES FOR CARRYING OUT THE INVENTION

Figure 1A:
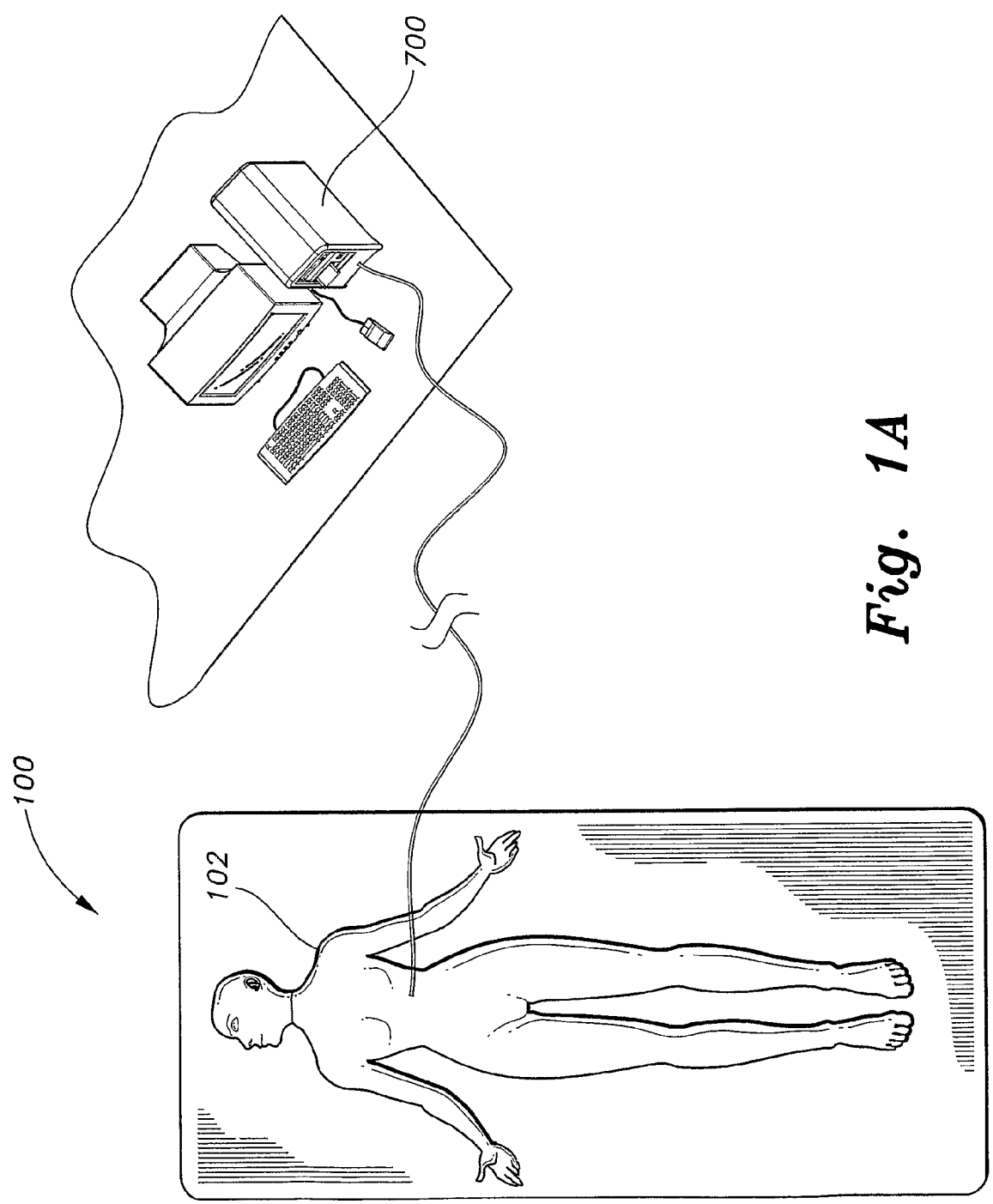
FIG. 1A is a diagrammatic view of an orthopedic procedures training simulator according to the present invention.
Figure 1B:
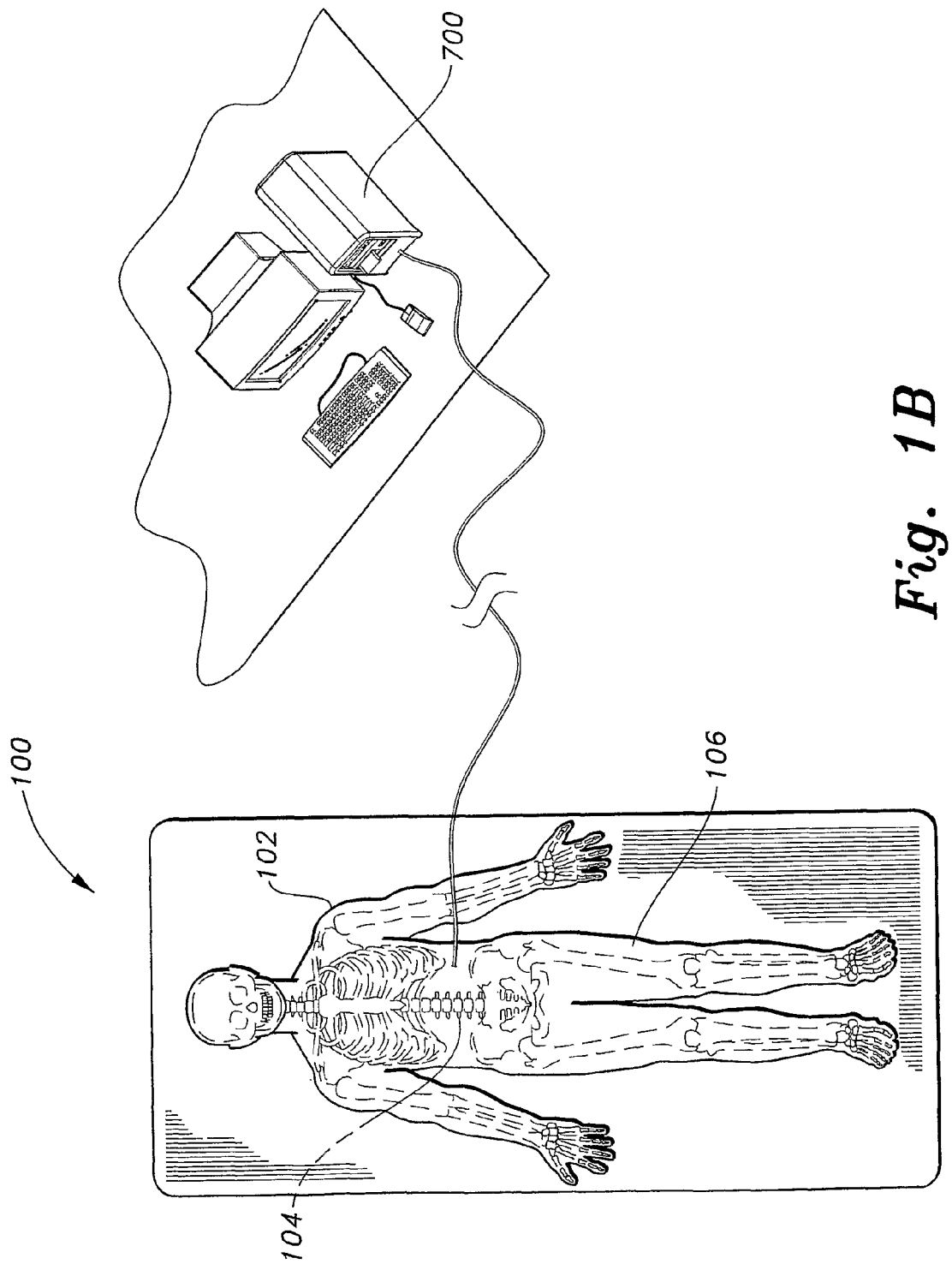
FIG. 1B is a diagrammatic view of the orthopedic procedures training simulator according to FIG. 1A, showing a skeletal structure internal to a training mannequin.
Figure 1C:
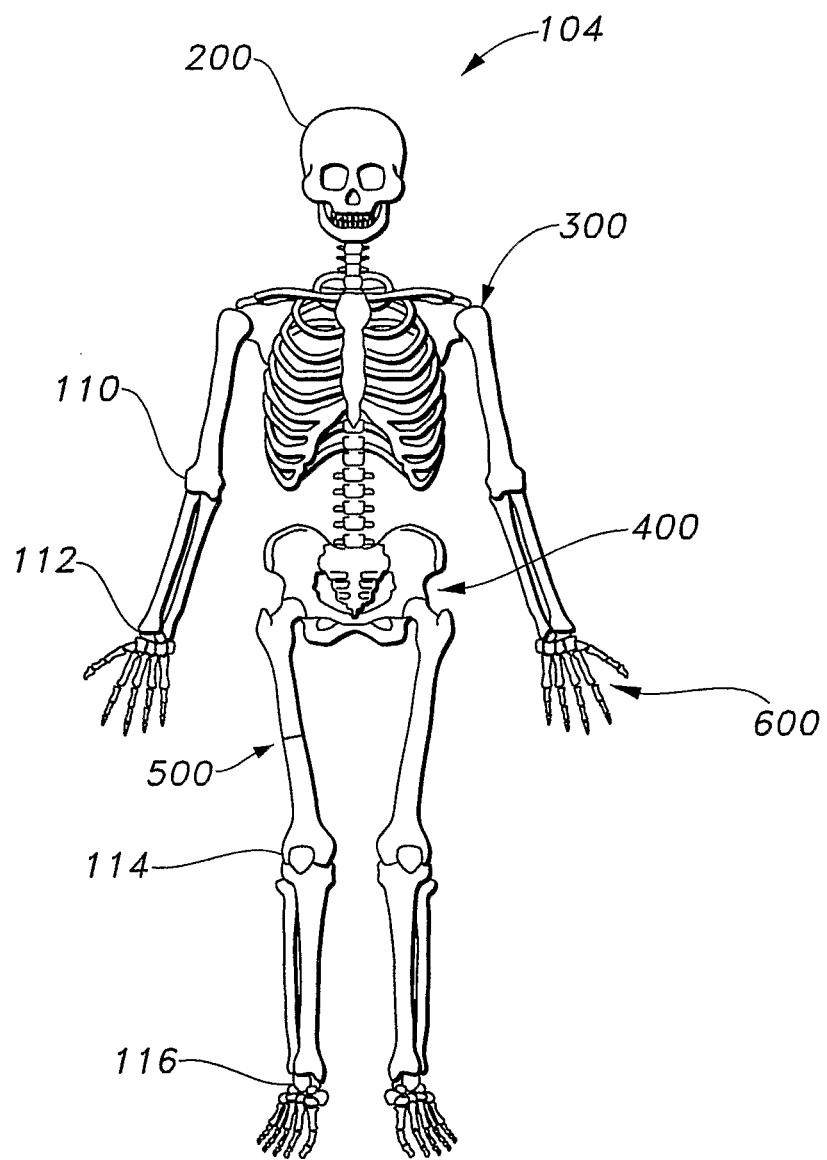
FIG. 1C is an anterior view of the skeletal structure seen in FIG. 1B.

The present invention is an orthopedic procedures training simulator, designated generally as 100 in the figures. Referring to FIGS. 1A-1C, the orthopedic procedures training simulator 100 is a figure or mannequin 102 generally, in the illustrated embodiment, in the form of a human body having an internal skeletal structure 104 adapted for simulating various orthopedic noxious events including joint dislocations and bone fractures.

The internal skeletal structure 104 is comprised of numerous skeletal members arranged generally in the form of a human skeleton. A covering 106 of foam or similar material surrounds the internal skeletal structure 104 to give the mannequin 102 a somewhat realistic appearance of a human body.

The internal skeletal structure 104 is instrumented by stress and torque sensors, position sensors, and electrical contacts located on and near various skeletal members of the internal skeletal structure 104. A computer system 700 is in communication with the sensors, the computer system 700 employing data gathered from the sensors to present interactive simulation and training of orthopedic procedures.

Various parts of the internal skeletal structure 104 are configured to allow the simulation of orthopedic injury, and to allow a student to perform procedures for the treatment and correction of the injuries. Major joints of the human skeleton, including the shoulder 300, hip 400, elbow 110, wrist 112, knee 114, and ankle 116 joints are configured to allow dislocation and relocation of the joint, or reduction of a fracture located near the joint, such as an ankle 116 fracture. Additionally, individual skeletal members may be configured for the simulation of a fracture, such as the femur 500.

Referring to FIGS. 2A and 2B, a skull 200 and cervical spine 202 structure is configured for training of various traction procedures, and particularly the use of Gardiner-Wells tongs for application of traction to the spine. Receptacles in the skull 200 allow for the placement of removable inserts 204 within the skull 200 in an appropriate location for the application of Gardiner-Wells tongs. The use of removable inserts 204 allows for the repeated practice of placement of the tongs and application of traction to the mannequin 102 without damage or wear to the mannequin 102 itself. The removable inserts 204 may be made of wood or any other suitable material. It should be noted that the removable inserts 204 are accessible through the covering 106 of the mannequin 102.

One or more sensors 206 are located along the cervical spine 202 to allow measurement of the tractive force applied. The sensors 206 are in communication with the computer system 700, whereby the measurement of the tractive force applied may be used in procedural simulation and evaluation. For example, the computer system 700 may issue an alert when a correct force is applied, or a warning when an excessive force is applied. Alternatively, the computer system 700 may generate diagnostic information from which a student must conclude whether or not an appropriate force is applied.

Figure 3A:
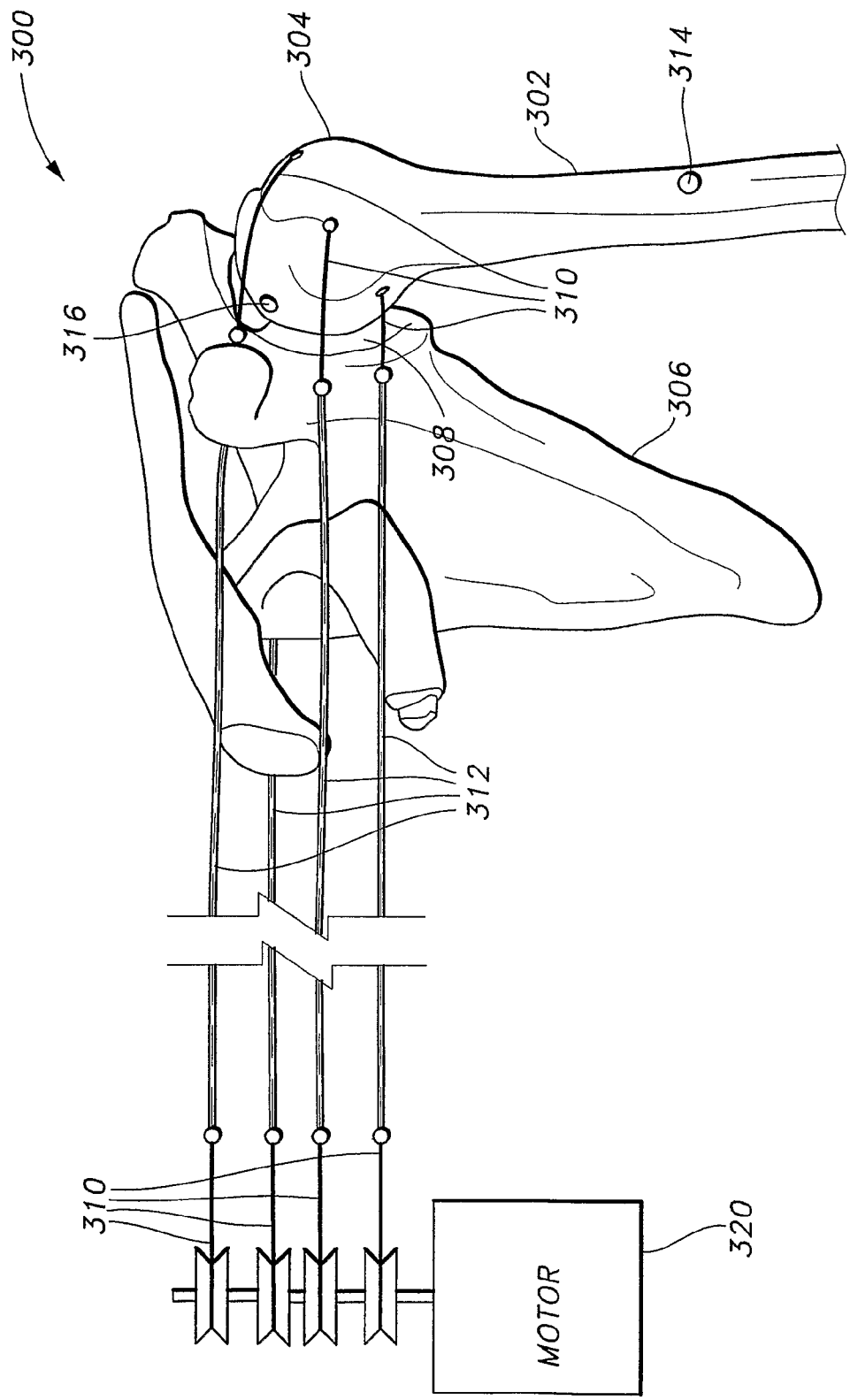
FIG. 3A is an anterior view of a skeletal shoulder structure, shown with the rounded head of the humerus normally seated within the Glenoid cavity of the scapula.
Figure 3B:
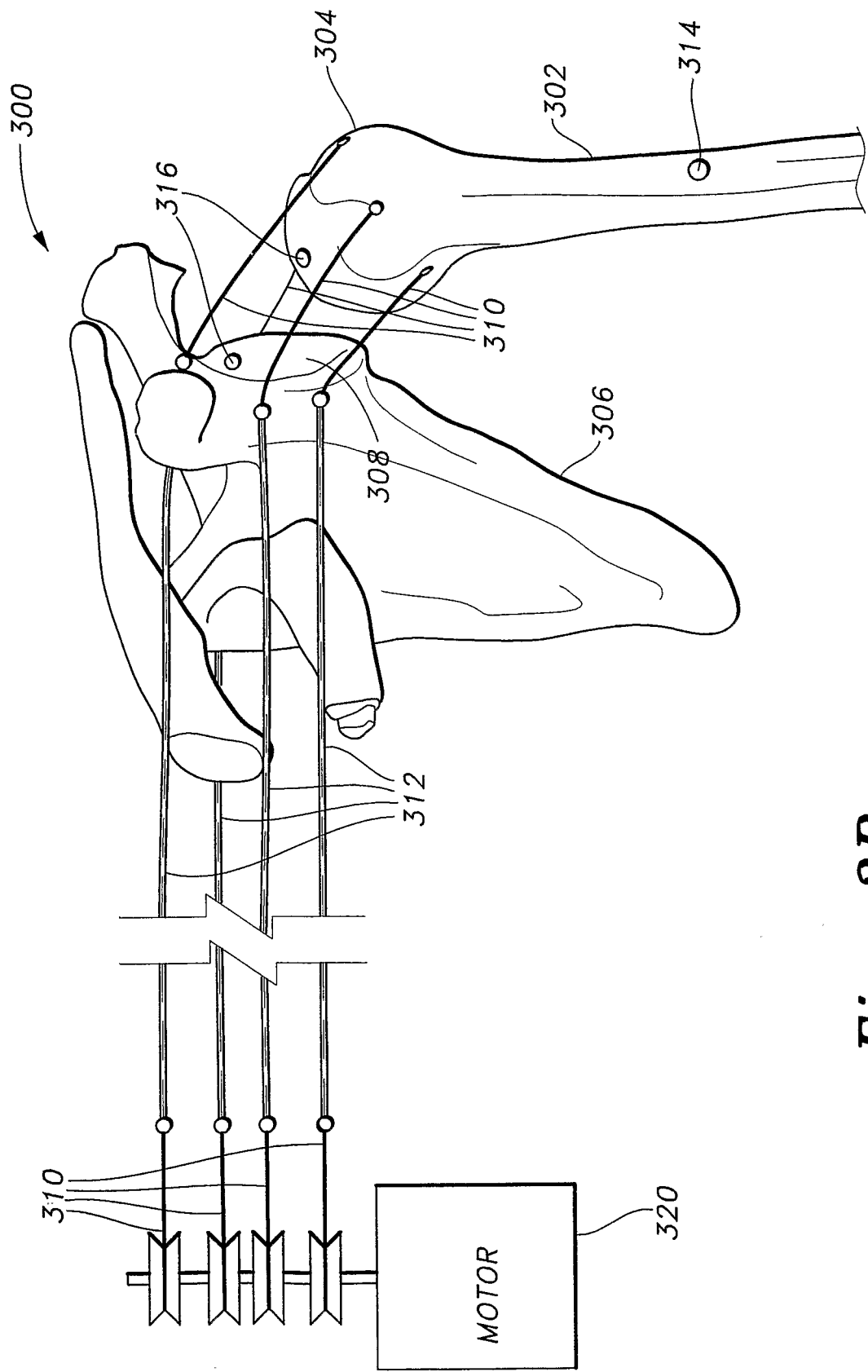
FIG. 3B is an anterior view of a skeletal shoulder structure, shown with the rounded head of the humerus dislocated from the Glenoid cavity of the scapula.

Turning now to FIGS. 3A and 3B, one or both shoulders 300 of the internal skeletal structure 104 are configured to allow the simulation of a shoulder dislocation. The shoulder 300 comprises a complex joint wherein the rounded head 304 of the humerus 302 is articulably seated within the Glenoid cavity 308 of the scapula 306, forming essentially a ball and socket joint. In human anatomy, the head 304 of the humerus 302 is held in place in the Glenoid cavity 308 by the muscles and tendons of the rotator cuff. In the orthopedic procedures training simulator 100, the head 304 of the humerus 302 is retained in place by a plurality of cables 310, the cables 310 being variably tensioned by a motor 320 or a plurality of motors 320. The cables 310 may be routed within the interior of the mannequin 102 through cable conduits or sheaths 312, or via a system of pulleys or cable guides or other means. The motor or motors 320 may be located within any suitable interior space within the mannequin 102.

While various arrangements of the cables 310 may be suitable, an arrangement of cables 310 that mimics the tendons of the rotator cuff provides increased realism in the movement and action of the shoulder 300.

The motors are controlled by the computer system 700 such that they may apply a variable amount of tension to the cables 310. Dislocation of the shoulder may be simulated by decreasing the tension of the cables 310, such that the head 304 of the humerus 302 may be removed from the Glenoid cavity 308. The head 304 of the humerus 302 may be repositioned to simulate various shoulder dislocations, such as an anterior, posterior, inferior, or intra-thoracic dislocation, and the cables 310 then re-tensioned.

The computer system 700 may control the motor or motors 320 to vary the tension applied to the cables 310, thereby varying the force necessary to perform a reduction. A torque sensor 314 is located along the humerus. The torque sensor 314 is used by the computer system 700 to measure the amount of force applied to the humerus 302 during the reduction procedure. If an excessive force is applied, the computer system 700 indicates that a fracture of the humerus 302 has been caused. Positional sensors 316 or electrical contacts may be located cooperatively on both the head 304 of the humerus 304 and within or adjacent to the Glenoid cavity 308 so that the computer system 700 may sense when a proper reduction of the dislocation has been achieved.

Figure 4A:
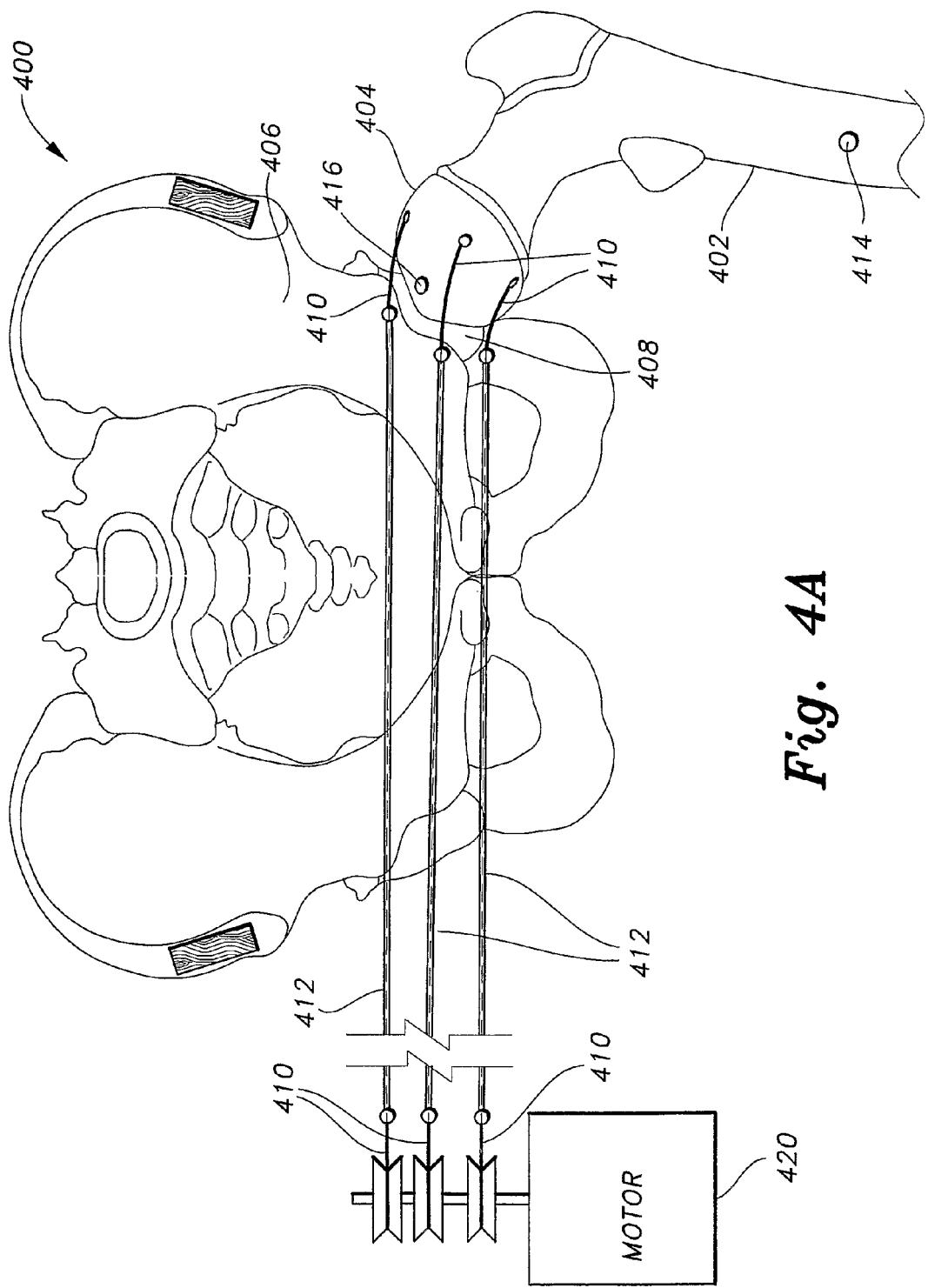
FIG. 4A is an anterior view of a skeletal hip joint structure, shown with the rounded head of the femur normally seated within the acetabulum of the pelvic bone.
Figure 4B:
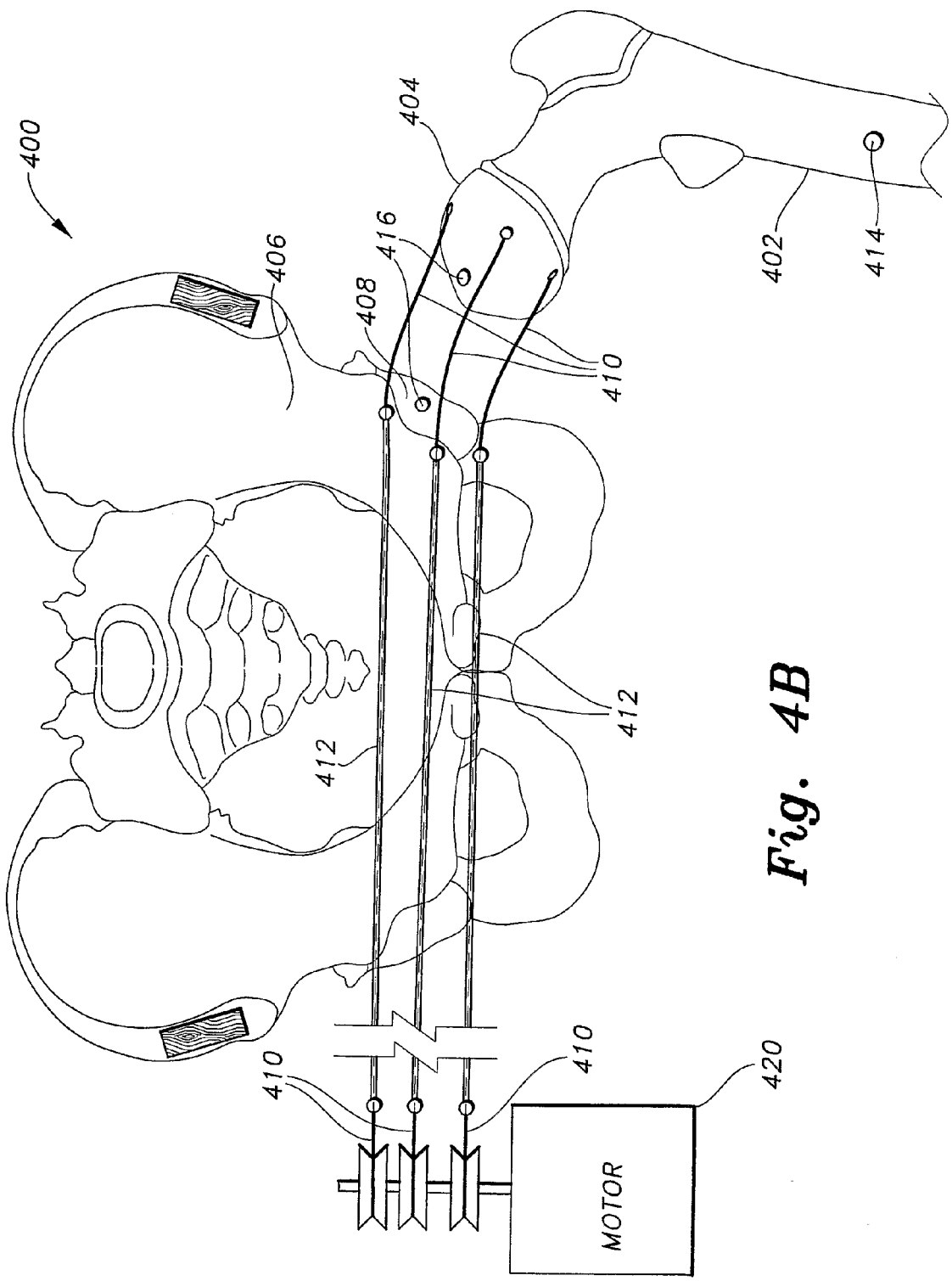
FIG. 4B is an anterior view of a skeletal hip joint structure, shown with the rounded head of the femur dislocated from the acetabulum of the pelvic bone.

Turning now to FIGS. 4A and 4B, one or both hips 400 of the internal skeletal structure 104 are configured to allow the simulation of a hip dislocation. The hip 400 comprises a complex joint wherein the rounded head (femoral head) 404 of the femur 402 is articulably seated within the acetabulum 408 of the pelvic bone 406, forming essentially a ball and socket joint. In human anatomy, the femoral head 404 is held in place in the acetabulum 408 by various muscles and tendons. In the orthopedic procedures training simulator 100, the femoral head 404 is retained in place by a plurality of cables 410, the cables being variably tensioned by a motor 420 or a plurality of motors 420. The cables 410 may be routed within the interior of the mannequin 102 through cable conduits or sheaths 412, or via a system of pulleys or cable guides or other means. The motor or motors 420 may be located within any suitable interior space within the mannequin 102.

The motors are controlled by the computer system 700 such that they may apply a variable amount of tension to the cables 410. Dislocation of the hip may be simulated by decreasing the tension of the cables 410, such that the femoral head 404 may be removed from the acetabulum 408. The femoral head 404 may be repositioned to simulate various hip dislocations, and the cables 410 then retensioned.

The computer system 700 may control the motor or motors 700 to vary the tension applied to the cables 410, thereby varying the force necessary to perform a reduction. A torque sensor 414 is located along the femur 402. The torque sensor 414 is read by the computer system 700 to measure the amount of force applied to the femur 402 during the reduction procedure. If an excessive force is applied, the computer system 700 indicates that a fracture of the femur 402 has been caused. Positional sensors 416 or electrical contacts may be located cooperatively on both the femoral head 404 and within or adjacent to the acetabulum 408 so that the computer system 700 may sense when a proper reduction of the dislocated hip has been achieved.

Turning now to FIGS. 5A-5C, various skeletal members of the internal skeletal structure 104 may be configured for the simulation of a break or fracture. In the instant embodiment, a femur 500 is shown incorporating a spring-hinged joint 530 between proximate 510 and distal 520 segments of the femur 500, whereby the femur 500 can be manipulated into a broken or a reduced (normal or unbroken) position.

The femur 500 is divided (or broken) into a proximal portion 510 and a distal portion 520. The proximal 510 and distal 520 portions are joined at break faces 512, 522 by the spring-hinge joint 530. The spring-hinge joint 530 comprises a telescoping piston member 532 and a surrounding tension spring 538. A first end 534 of the piston member 532 is pivotally attached to the proximal portion 510 by a pivot pin 516 within a recess 514 formed in the break face 512, while a second end 536 of the piston member 534 is pivotally attached to the distal portion 520 by a pivot pin 526 within a recess 524 formed in the break face 522. The tension spring 538 is attached between the proximal 510 and distal 520 portions.

The tension spring 538 holds the proximal 510 and distal 520 portions together. Note that the break faces 512 and 522 may be formed with cooperating surface features such that the proximal 510 and distal 520 portions tend to interlock together in the normal, "unbroken" position shown in FIGS. 5A and 5B. As shown in FIG. 5C, pulling the proximal 510 and distal 520 portions apart against the tension spring 538, the piston member 532 elongates and allows the proximal 510 and distal 520 portions to separate. The proximal 510 and distal 520 portions may be displaced laterally relative to one another, into a position simulating a break in the femur 500.

Receptacles are formed in the distal femur 502 for the placement of removable inserts 504. The removable inserts 504 are used to allow for the placement of fixation or traction devices, such as a Steinman traction pin. The removable inserts 504 may be made of wood or any other suitable material. It should be noted that the removable inserts 504 are accessible through the covering 106 of the mannequin 102.

One or more tension sensors 506 are located along the femur, such as in connection with the piston member 530 or tension spring 538. The sensors 506 are in communication with the computer system 700, whereby the measurement of an applied tractive force applied may be used in procedural simulation and evaluation. The computer system 700 may be activated when a correct amount of weight is applied for reduction, for example to generate a simulated x-ray image of the correctly reduced fracture.

Positional sensors 508 or electrical contacts may be located cooperatively on both the break faces 512 and 522 so that the computer system 700 may sense when a proper reduction of the broken femur 500 has been achieved.

Figure 6:
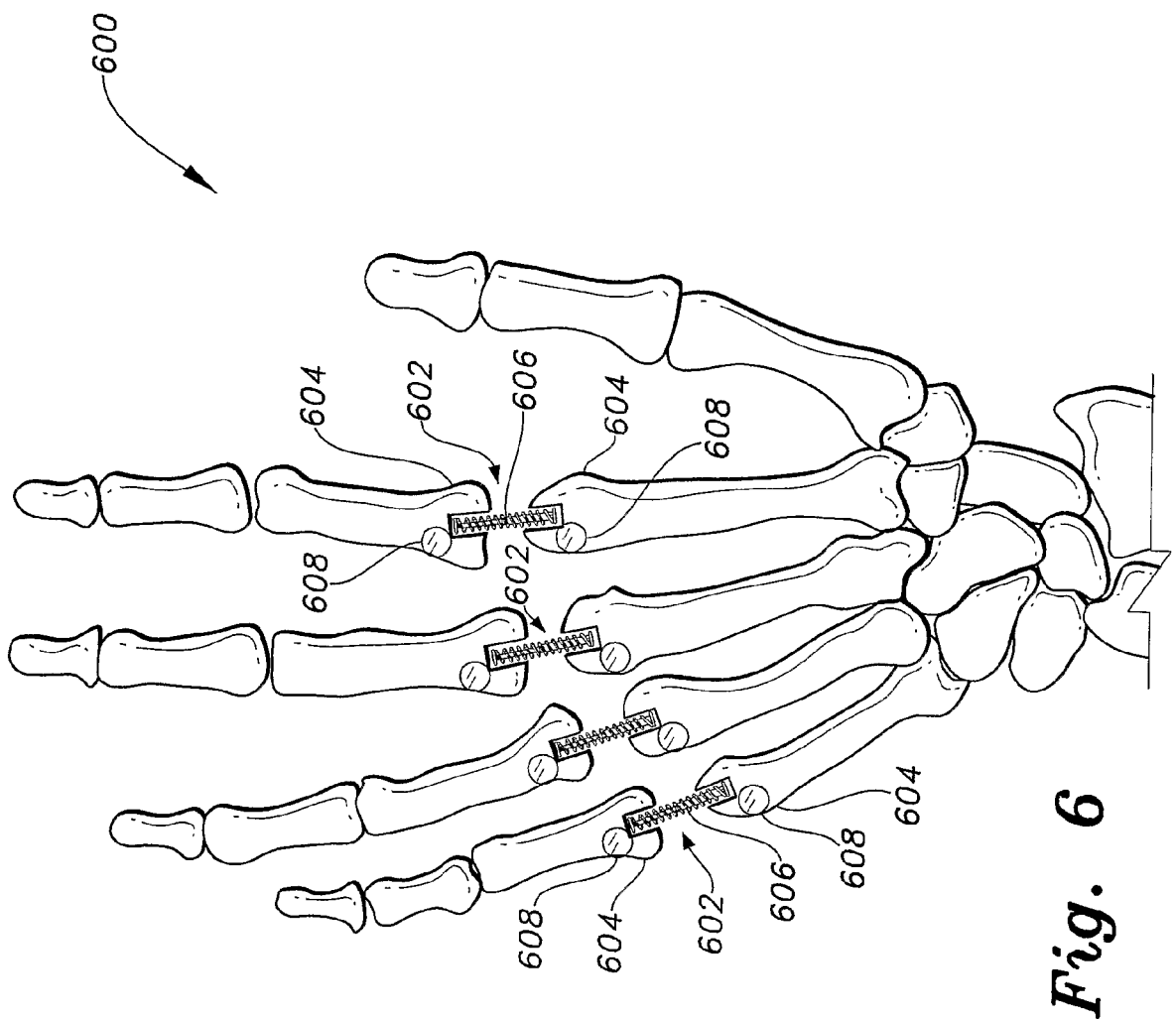
FIG. 6 is a diagrammatic illustration of a skeletal hand structure.

Tuning now to FIG. 6, one or both hands 600 of the internal skeletal structure 102 are configured to allow the simulation of finger fractures or dislocations. Joints 602 between adjoining finger bones 604 are connected with a spring-hinge assembly 606 similar to that shown in FIGS. 5B and 5C. The spring-hinge assemblies 606 are oriented and configured for the simulation of anterior, lateral, medial, and posterior dislocations and reductions. Positional sensors 608 or electrical contacts may be located cooperatively on both sides of each finger joint 602 so that the computer system 700 may sense when a proper reduction has been achieved.

Returning briefly to FIG. 1C, now with an understanding of the shoulder 300 and hip 400 structures and the spring-hinge assemblies 530 and 606, shown simulating a broken femur 500 and finger dislocations, it can be understood that the elbow 110, wrist 112, knee 114, and ankle 116 joints may be similarly configured to allow dislocation and relocation of the joint, or reduction of a fracture located near the joint, as well as to employ positional sensors or electrical contacts cooperatively located so that the computer system 700 may sense when a proper reduction has been achieved.

Figure 7:
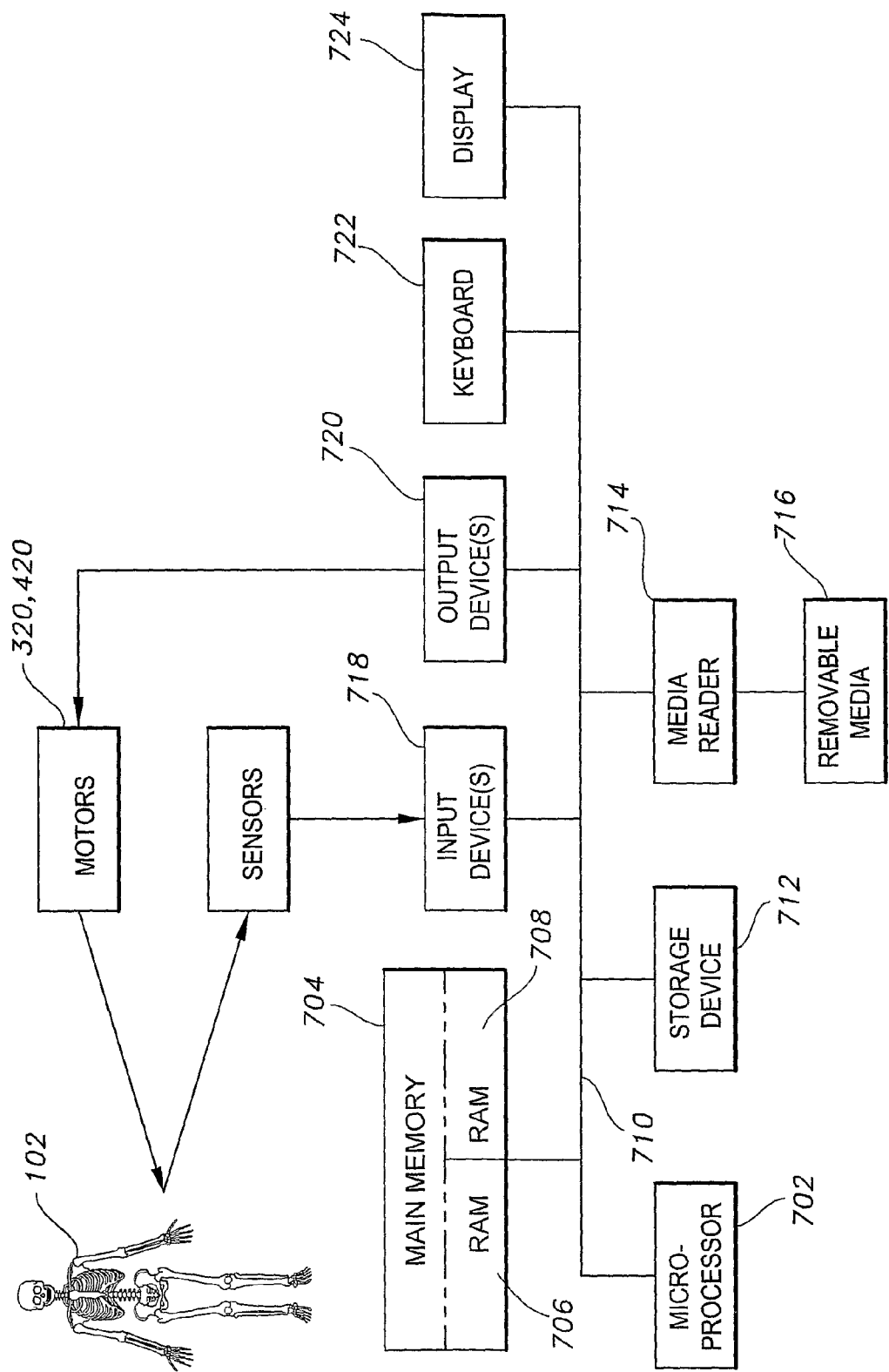
FIG. 7 is a block diagram of a computer system employed by the orthopedic procedures training simulator of the present invention.

Turning now to FIG. 7, the computer system 700 comprises a microprocessor 702 connected by a bus 710 to an area of main memory 704, comprising both random access memory (RAM) 706, and read only memory (ROM) 708. The microprocessor 702 is additionally in communication with a storage device 712, such as a disk storage device, having means for reading a coded set of program instructions on a computer readable medium, which may be loaded into main memory 704 and executed by the microprocessor 702. Additional storage devices may be provided, such as a media reader 714 for reading a removable storage media 716 such as a removable disk drive, CD-ROM drive, or the like. The computer system 700 also includes a variety of input devices 718 and output devices 720.

In addition to various common peripheral devices that may be optionally included among the input 718 and output 720 devices, input devices 718 may include signal buffers, level converters, analog-to-digital converters and other circuitry for reading the signals provided by the sensors disposed in the internal skeletal structure 102. Output devices 720 may include switches, digital-to-analog converters, and other circuitry for driving the motors 320 and 420 that interact with the internal skeletal structure 102.

The computer system 700 includes means for providing a user interface. In the illustrated embodiment, the user interface comprises a keyboard 722 and a display 724. The computer system 700 may be a personal computer or any other type of general purpose computer, with interfaces added for interaction with the motors 320 and 420 and the sensors.

Figure 8:
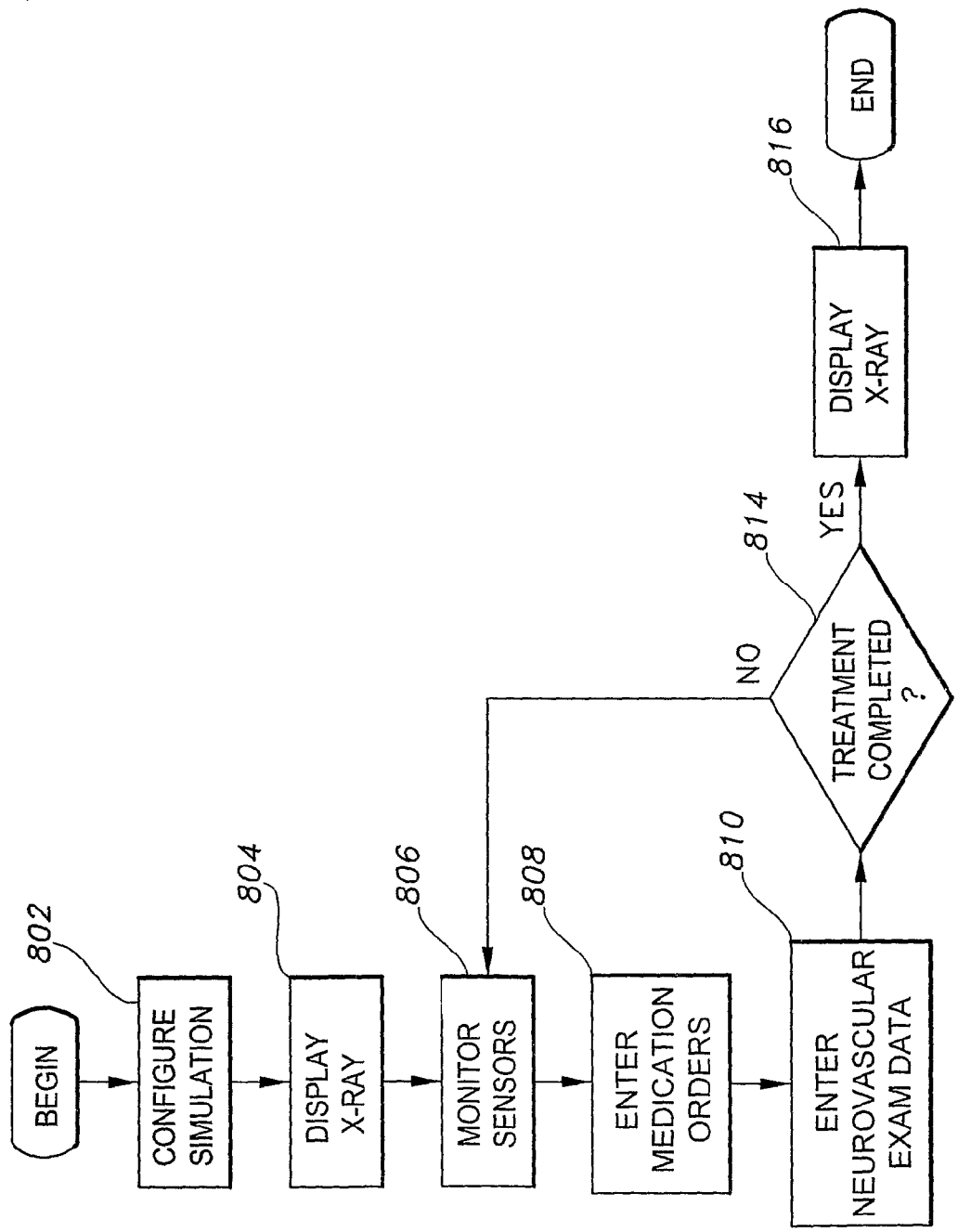
FIG. 8 is a flowchart describing the general use of an orthopedic procedures training simulator of the present invention.

A computer program stored on the storage device 712, or loaded from a removable storage media 716, controls the operation of the orthopedic procedures training simulator 100. Turning to FIG. 8, the general operation of the orthopedic procedures training simulator 100 is described. Use of the orthopedic procedures training simulator 100 begins with configuration of a given procedural simulation (step 802). This configuration may involve manually manipulating a joint or skeletal member of the internal skeletal structure 102 into a dislocated or broken position. In certain simulations, the computer program is commanded to drive one or more of the motors 320, 420 to apply or remove tension from a joint, placing the joint into a dislocated state. The computer program may read data from the various sensors located within the internal skeletal structure 102 to create an initial dataset descriptive of the condition and its symptoms. An initial, pre-procedural, x-ray image is created (step 804) from which a student or trainee will make an initial diagnosis of the condition.

As the student or trainee performs diagnosis and attempts to perform a corrective procedure, the computer program continues to monitor the sensors (step 806). Additionally, the computer program allows for the entry of medication orders (step 808), and allows presentation or entry of neurovascular exam data appropriate for the simulation (step 810). The sensor data includes positional data from which the computer program may sense proper reduction of the dislocation or fracture, indicating successful completion of the procedure or a part of the procedure (at 814). Following completion of the procedure, or upon request by the student or trainee, a post-procedural x-ray is generated (step 816). The post-procedural x-ray is generated, based on current sensor data, to indicate a successful or a failed outcome of the procedure.

Figure 9:
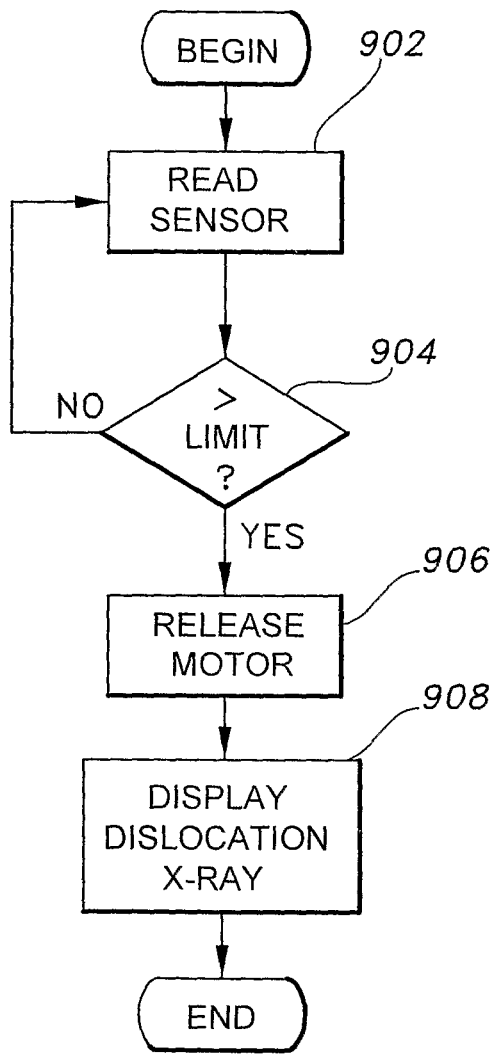
FIG. 9 is a flowchart describing a function of simulating the dislocation of a joint of the orthopedic procedures training simulator.

A special case of the configuration step 802 may be employed for the shoulder 300 and hip 400 joints. Referring to FIG. 9, the computer program may read a torque or stress signal (step 902) from a sensor associated with the joint, such as, in the case of the hip, the femoral torque sensor 414 located proximately to the hip 400. Upon exerting a manual force on the femur 402, the force exceeding a predefined limit (at 904), the computer program directs the motor 430 to release tension on the cables 410 (step 906), thereby allowing dislocation of the hip 400. A pre-procedural x-ray (generated at step 908) indicates the dislocation.

Figure 10:
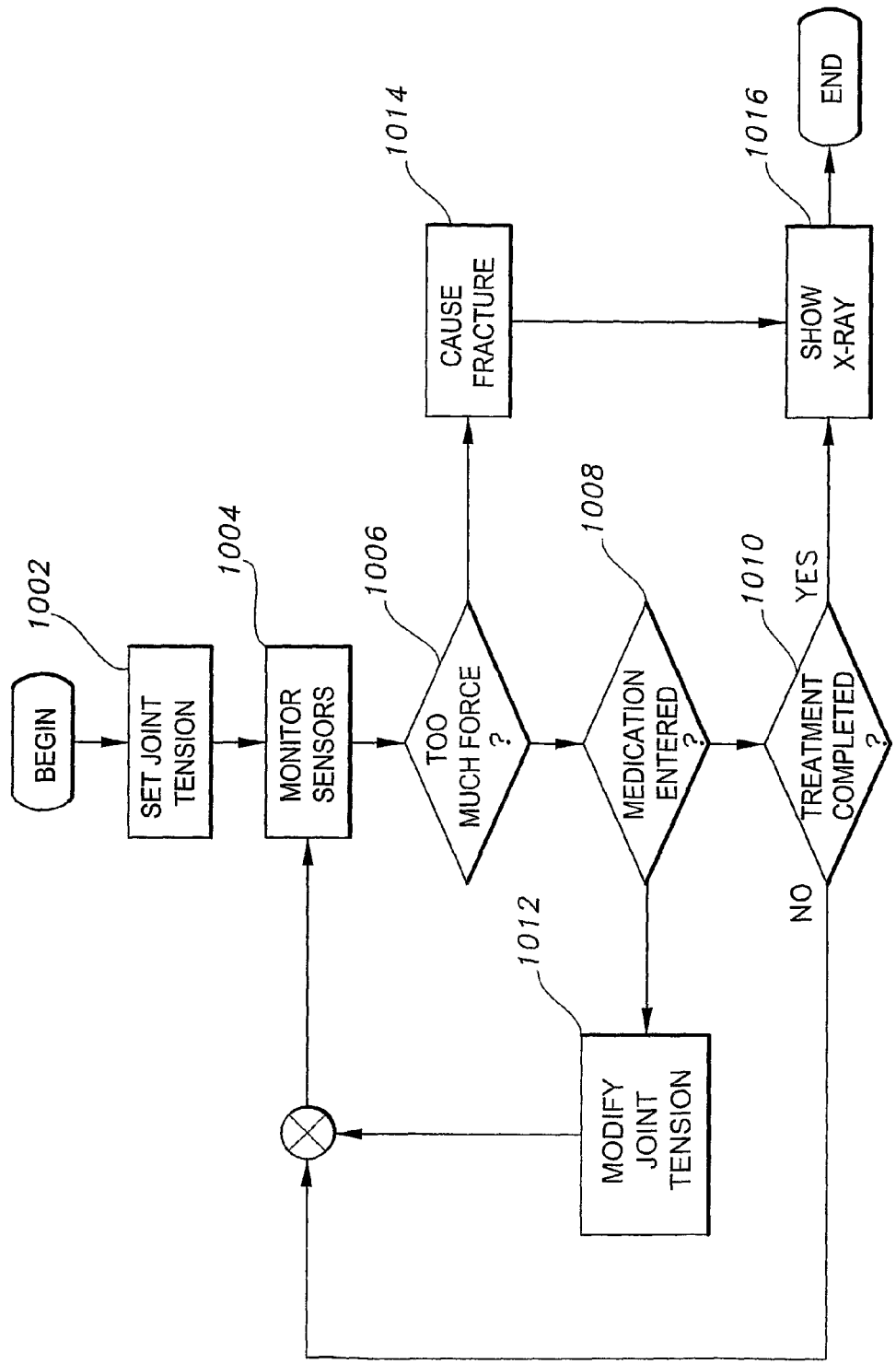
FIG. 10 is a flowchart describing a function of providing procedural training for the treatment of an orthopedic noxious event simulated by the orthopedic procedures training simulator.

A procedural training simulation, involving procedures of the shoulder or hip, is described in further detail in FIG. 10. After the orthopedic procedures training simulator 100 is configured for simulation of a shoulder 300 or hip 400 dislocation, generally as described above in reference to the flowchart of FIG. 9, the computer program drives motors appropriately to set cable tension, fixing the joint into the dislocated position (step 1002) and setting a simulated muscle tension for the intended simulation and procedure. It is to be noted that the simulation may account for situations where musculature surrounding the joint is tensed, increasing the difficulty in mechanically achieving a reduction. Thus, a student or trainee will need to follow appropriate procedures beyond simple mechanical manipulation to achieve a proper reduction.

The computer program monitors sensor inputs during the course of the simulation (step 1004), including both force and positional sensor inputs. If an excessive force is applied during the procedure (at 1006), the computer program may simulate a fracture resulting from an incorrectly performed procedure (step 1014), which may be shown by x-ray (step 1016). Also during the course of the simulation, the computer program allows the entry of medication orders, such as the administration of a sedative, local anesthetic, or other medication to relieve muscle tension and facilitate mechanical reduction. If a medication is entered (at 1008), the computer program drives one or more of the motors to simulate the effect of the medication on the relevant musculature, such as reducing tension applied to the joint (step 1012).

The simulation continues until the procedure is completed, or the simulation halted by a user command entered to the computer program. The procedure may be determined to be completed either by the successful reduction of the dislocation, or by a fracture or other negative outcome. Once the procedure is completed (at 1010), an appropriate post-procedural x-ray is generated, based on acquired sensor data and other information.

It is to be understood that the present invention is not limited to the embodiment described above, but encompasses any and all embodiments within the scope of the following claims.

I claim:

1. An orthopedic procedures training simulator, comprising:
   a mannequin having an interior skeletal structure and an exterior covering generally in the form of a living being;
   said interior skeletal structure comprising a plurality of skeletal structures movable between a first position simulating normal and healthy skeletal structure and a second position simulating an orthopedic injury;
   tension means simulating muscular tension tending to retain at least one of said skeletal structures in either said first position or said second position, wherein said tension means comprises at least one motor and at least one cable joining a pair of said skeletal structures, the cable being connected to the motor, whereby selective actuation of the motor controls tension in the cable;
   a plurality of force and positional sensors associated with said plurality of skeletal structures;
   a computer processor in communication with said tension means and said force and positional sensors;
   a user interface in communication with said computer processor;
   a computer readable program code contained in and executable by said computer processor, the program code having means for reading said force and positional sensors, means for controlling said tension means, means for generating diagnostic information displays, and means for entering medication-related data into memory; and
   wherein said means for controlling said tension means is selectively and adjustably actuated dependent upon the medication-related data entered into memory, the tension in said at least one cable simulating a state of muscular relaxation in the living being when the living being is under the influence of the medication.

2. The orthopedic procedures training simulator as recited in claim 1, wherein said tension means comprises at least one spring-hinged joint joining a pair of said skeletal structures, the spring hinged joint simulating a joint of the living being.

3. The orthopedic procedures training simulator as recited in claim 2, wherein the pair of said skeletal structures is selectively elastically separable, simulating dislocation of the joint of the living being.

4. The orthopedic procedures training simulator as recited in claim 1, wherein said means for generating diagnostic information displays includes means for generating simulated x-ray images of at least one of said plurality of skeletal structures, the generated images being dependent upon signals generated by said plurality of force and positional sensors positioned adjacent said at least one of said plurality of skeletal structures.

5. The orthopedic procedures training simulator as recited in claim 1, wherein said computer readable program code includes means for comparing a force measured by at least one of said force sensors to a threshold force value and for generating an alert signal when the measured force exceeds the threshold force value.

6. The orthopedic procedures training simulator as recited in claim 1, wherein said program code includes means for entering neurovascular-related data into memory.

7. The orthopedic procedures training simulator as recited in claim 1, further comprising at least one protective member mounted on at least one of said plurality of skeletal structures, said at least one protective member being adapted for protecting said at least one of said plurality of skeletal structures from contact by a medical implement.

8. The orthopedic procedures training simulator as recited in claim 1, wherein said plurality of force sensors includes at least on torque sensor.

9. The orthopedic procedures training simulator as recited in claim 1, wherein said plurality of positional sensors includes at least one pair of electrical contacts, said pair of electrical contacts being mounted on adjacent members of said plurality of skeletal structures.

10. The orthopedic procedures training simulator as recited in claim 1, wherein said plurality of force sensors comprises at least one tension sensor disposed to measure tension in said at least one spring-hinged joint.

11. An orthopedic procedures training simulator, comprising:
- a mannequin having an interior skeletal structure and an exterior covering generally in the form of a living being;
- said interior skeletal structure comprising a plurality of skeletal structures movable between a first position simulating normal and healthy skeletal structure and a second position simulating an orthopedic injury;
- tension means for simulating muscular tension tending to retain at least one of said skeletal structures in either said first position or said second position;
- a plurality of force and positional sensors associated with said plurality of skeletal structures;
- a computer processor in communication with said tension means and said force and positional sensors; and
- a computer readable program code contained in and executable by said computer processor, the program code having means for reading said force and positional sensors, means for controlling said tension means, and means for generating diagnostic information displays,
- wherein said means for generating diagnostic information displays includes means for generating simulated x-ray images of at least one of said plurality of skeletal structures, the generated images being dependent upon signals generated by said plurality of force and positional sensors positioned adjacent said at least one of said plurality of skeletal structures.

12. An orthopedic procedures training simulator, comprising:
- a mannequin having an interior skeletal structure and an exterior covering generally in the form of a living being;
- said interior skeletal structure comprising a plurality of skeletal structures movable between a first position simulating normal and healthy skeletal structure and a second position simulating an orthopedic injury;
- tension means simulating muscular tension tending to retain at least one of said skeletal structures in either said first position or said second position, wherein said tension means comprises at least one spring-hinged joint joining a pair of said skeletal structures, the spring-hinged joint having a telescoping piston member with opposed first and second ends being respectively pivotally joined to adjacent members of the pair of said skeletal structures and a tension spring concentrically disposed around the piston member;
- a plurality of force and positional sensors associated with said plurality of skeletal structures;
- a computer processor in communication with said tension means and said force and positional sensors;
- a computer readable program code contained in and executable by said computer processor, the program code having means for reading said force and positional sensors, means for controlling said tension means, and means for generating diagnostic information displays.

* * * * *